United States Patent

Chou et al.

[11] 4,054,910
[45] Oct. 18, 1977

[54] COMMUNICATION SYSTEM FOR THE TRANSMISSION OF CLOSED CIRCUIT TELEVISION OVER AN ORDINARY PAIR OF WIRES

[75] Inventors: Wayne W. Chou; Richard Erett, both of Stamford, Conn.

[73] Assignee: Tel-E-Tel, Inc., Stamford, Conn.

[21] Appl. No.: 661,530

[22] Filed: Feb. 26, 1976

[51] Int. Cl.$^2$ .............................................. H04N 7/18
[52] U.S. Cl. ........................................ 358/86; 325/308; 330/252; 330/295; 333/12
[58] Field of Search .............. 178/6, 59, 61, DIG. 13; 325/308; 330/30 D; 333/12; 358/86

[56] References Cited

U.S. PATENT DOCUMENTS

| | | |
|---|---|---|
| 2,034,032 | 3/1936 | Green .......................... 178/DIG. 13 |
| 3,660,773 | 5/1972 | Free ............................. 330/30 D |
| 3,705,365 | 12/1972 | Szabo ........................... 333/12 |

OTHER PUBLICATIONS

Killion, Wm. D., *Video Transmission Techniques,* © 1968, Dynair Electronics Inc., pp. 16, 17, 25-36.

*Primary Examiner*—Howard W. Britton
*Attorney, Agent, or Firm*—Joseph Levinson

[57] ABSTRACT

A communication system is provided which allows closed circuit television pictures to be transmitted from conventional TV cameras to conventional monitors via an ordinary pair of wires, for example, telephone wires, lamp cord, BX cable, etc., over limited distances without measurable degradation of picture quality. A balanced system is provided with dual inputs and outputs so that the system can accommodate simultaneous transmission of audio or other data. Adapters are provided on the receiving end and on the sending end which provide conversion, impedance matching, and the frequency compensation required in order to provide uniform frequency response for the quality transmission of television as well as audio and/or other data.

3 Claims, 3 Drawing Figures

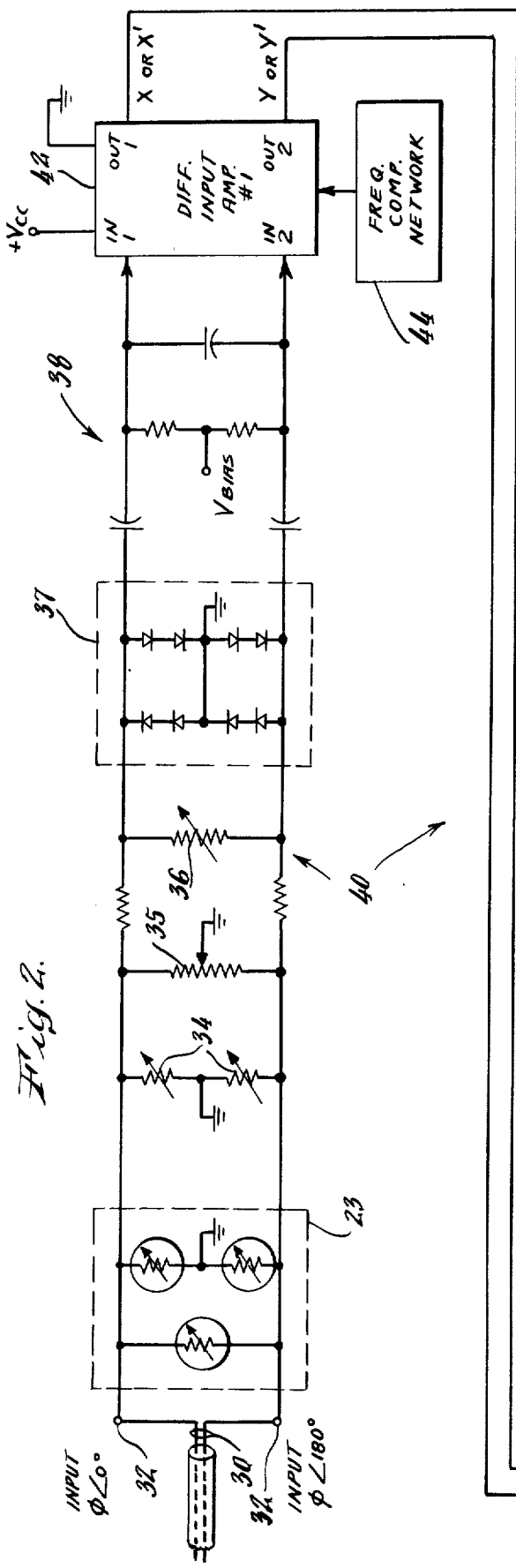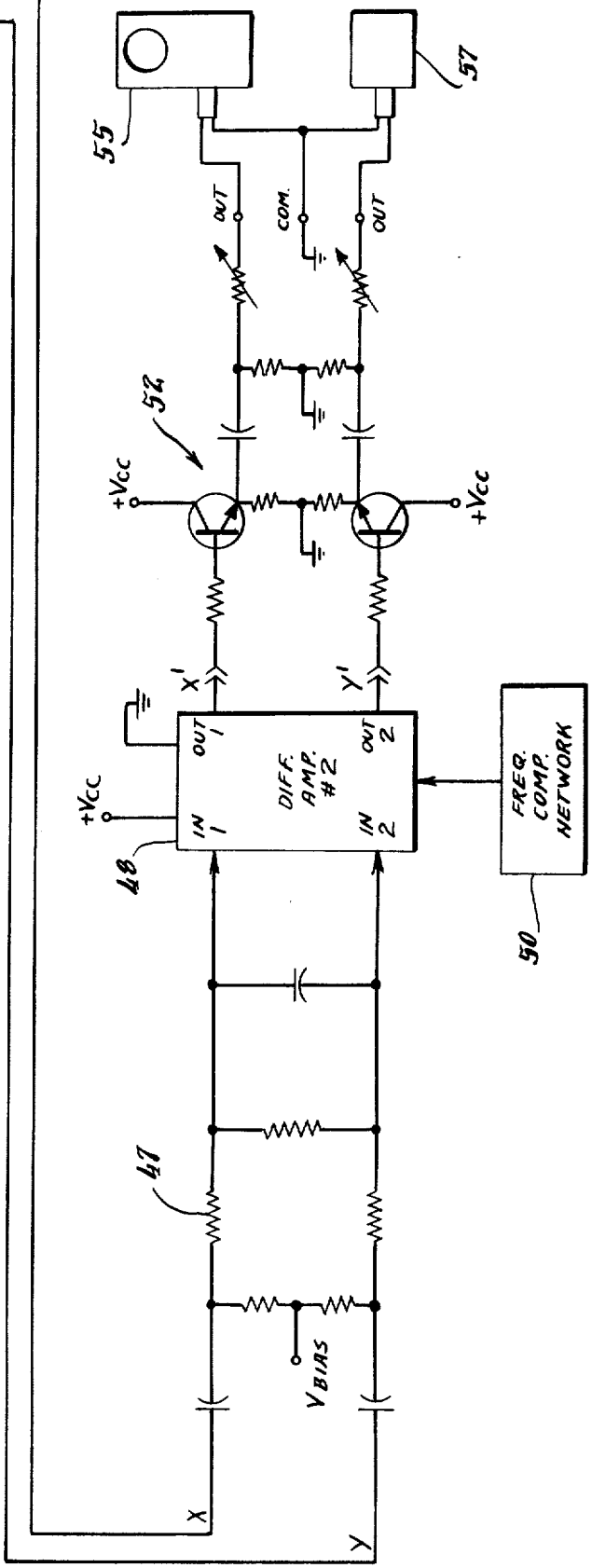
Fig. 2.

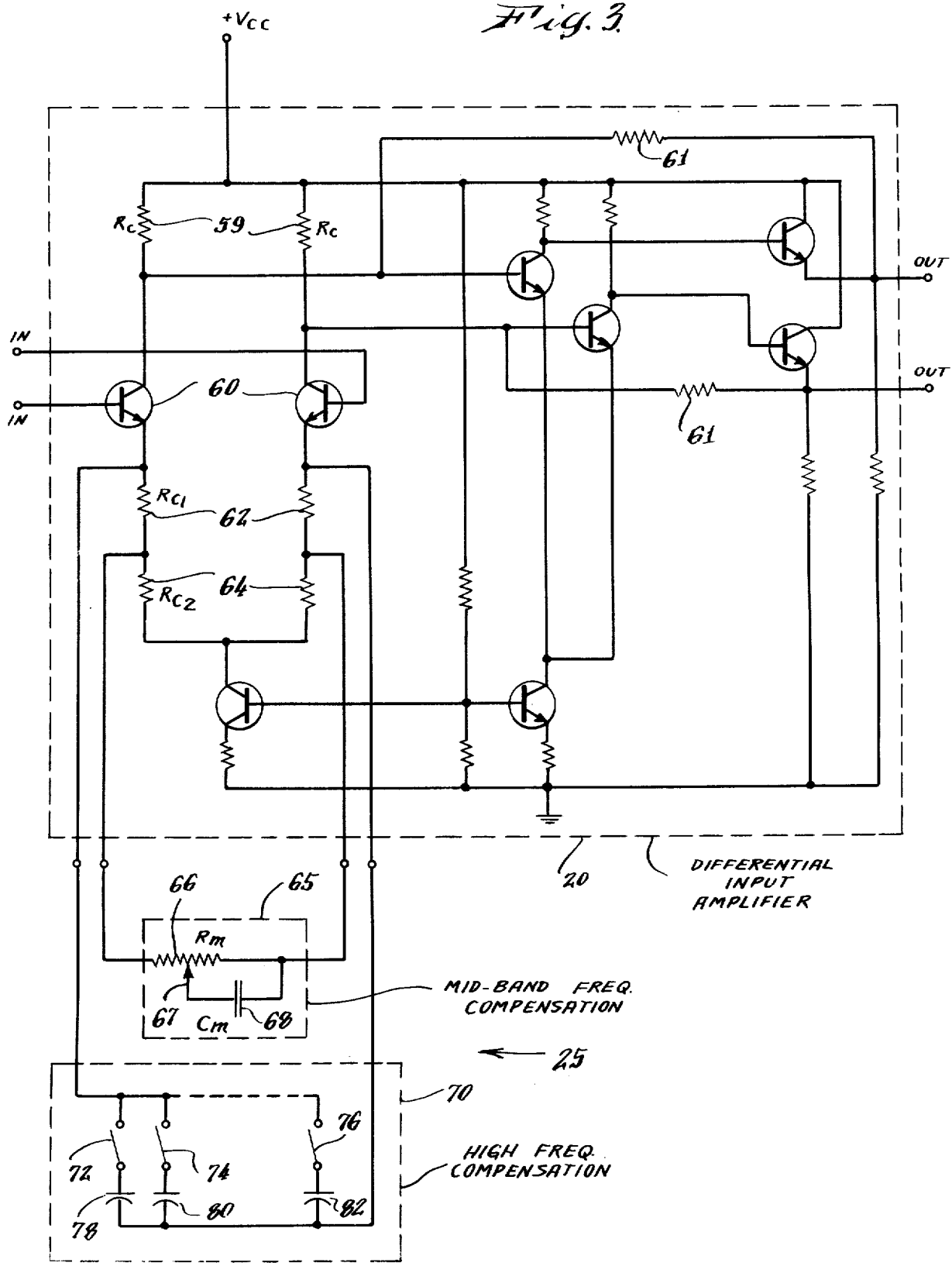

COMMUNICATION SYSTEM FOR THE TRANSMISSION OF CLOSED CIRCUIT TELEVISION OVER AN ORDINARY PAIR OF WIRES

BACKGROUND OF THE INVENTION

This invention relates to a communication system for the transmission of closed circuit television signals over an ordinary pair of wires which can also handle the transmission of audio and/or other data over the same wires.

The normal mode of closed circuit television transmission normally involves microwave or a shielded coaxial cable between the camera and the monitor of the television system. This type of closed circuit link may present problems where the installation, for example, is within a building of from one building to another. Such installations may prove both expensive and impractical, not so much, necessarily, because of the cost of the wire in linking up an installation within a building, but because of the time and labor required in running new coaxial cable in an established building or location. Many such applications, for example within a building, already contain miles of unused or spare pairs of wire within the walls and/or floors. Systems have been proposed which connect onto these wires for the transmission of closed circuit television pictures. Such systems, which for many applications are eonomical when compared with installing lengths of shielded coaxial cable, still suffer the disadvantage of time-consuming installation and adjustment requirements. The proposed systems are generally single-ended. When drift occurs in such single-ended systems, the systems are difficult to keep balanced, and require continual readjustments.

OBJECTS AND SUMMARY OF THE INVENTION

Accordingly, it is an object of this invention to provide a communication system for the transmission of closed circuit television over an ordinary pair of wires, which is of small size, relatively maintenance free, and requires only a small number of minor adjustments for each separate installation.

A further object of this invention is to provide a communication system using an ordinary pair of wires for the transmission of closed circuit television which is virtually identical to the transmission over a separate coaxial cable in that the system is relatively insensitive to external fields and interferences.

Still another object of this invention is to provide a new and improved communication system for the transmission of closed circuit television over an ordinary existing pair of wires which is nominal in cost, compares favorably with the use of coaxial cable in many applications, may be used in those applications where the use of coaxial cable is impractical, and may accommodate other types of transmission.

In carrying out this invention in one illustrative embodiment thereof, a communication system is provided in which a camera is coupled via a transmitter adapter to a pair of wires which have a receiver adapter and a monitor coupled a distance along the pair of wires for providing a closed circuit link. The transmitter and receiver adapters provide the conversion, impedance matching and frequency compensation required for providing the television transmission along the pair of wires. Dual inputs and outputs are provided to accommodate other forms of transmission. The transmitter and receiver adapters each includes differential amplifiers along with suitable frequency compensation networks which provide the necessary compensation with a minimum of adjustments while being insensitive to external fields and interferences.

BRIEF DESCRIPTION OF THE DRAWINGS

FIG. 2 is a simplified schematic diagram of one form of receiver adapter unit embodied in the present invention.

FIG. 3 is a schematic diagram of one form of differential amplifiers and frequency compensation networks employed in the circuits shown in FIGS. 1 and 2.

DESCRIPTION OF THE PREFERRED EMBODIMENTS

Figure 1:
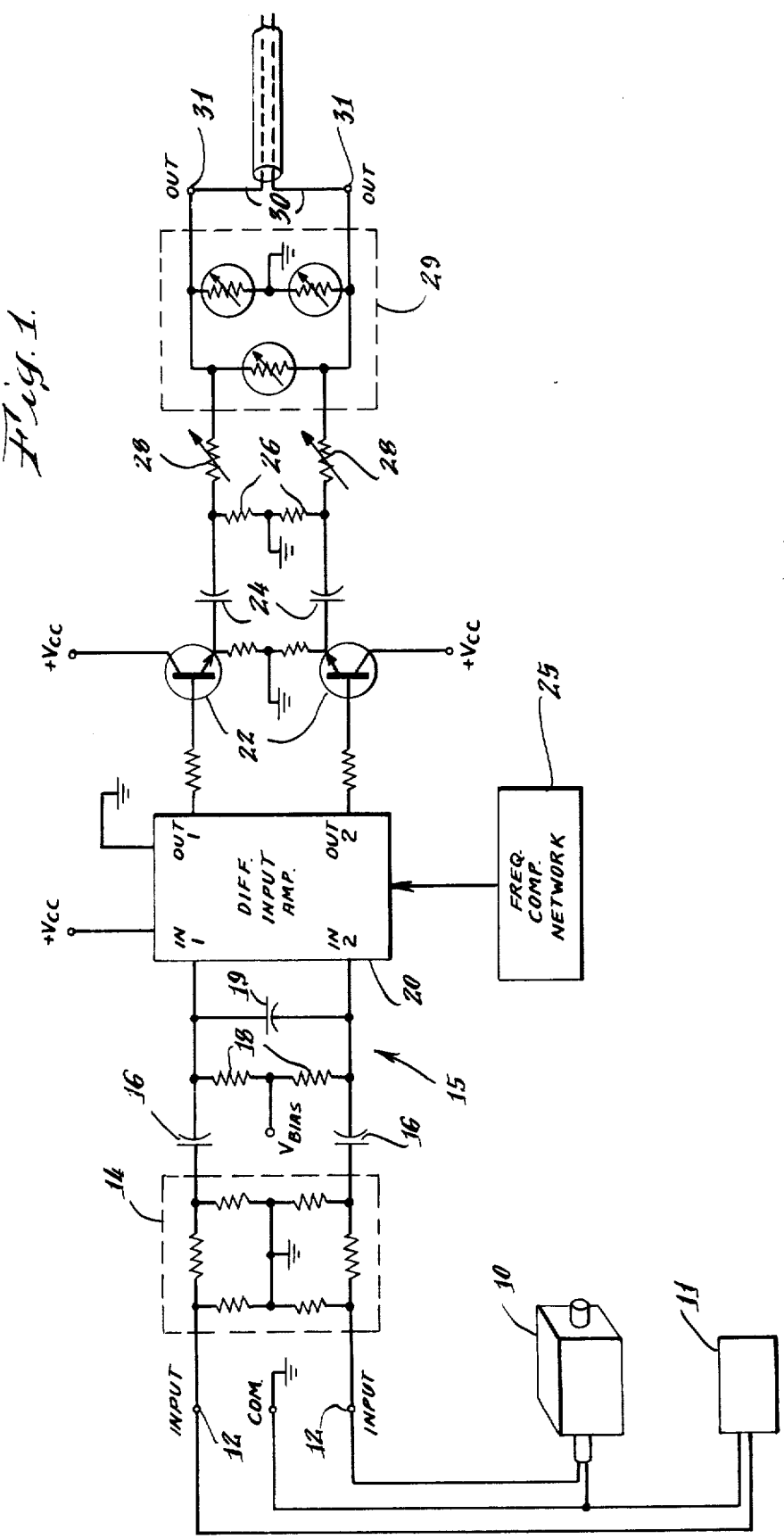
FIG. 1 is a simplified schematic diagram of one form of transmitter adapter unit embodied in this invention.

Referring now to FIG. 1, a transmitter adapter unit 15 is employed at the sender end of the communication system for coupling a video camera 10 to an ordinary pair of wires 30. The video camera 10, having an impedance of approximately 75 ohms, is coupled to either identical input 12 of the transmitter adapter unit 15. The input terminals 12 are identical except for a difference of 180° in phase, so, accordingly, the outputs may be reversed in order to achieve the desired polarity. The input terminals 12 are coupled to an input matching impedance network 14 which is coupled via coupling capacitors 16 and bias network resistors 18, shunted by a capacitor 19 to the inputs of a differential amplifier 20. The input impedance matching network 14 optimizes the input termination of the differential amplifier 20 to the input source, which is illustrated as camera 10. The coupling capacitors 16 and the bias network resistors 18 determine the low-frequency cutoff of the differential amplifier 20, while the shunt capacitor 19 limits the high frequency end. A frequency compensation network 25 is coupled to the differential amplifier which will be explained in detail in connection with FIG. 3. The output of the differential amplifier 20 is coupled to emitter followers 22 through coupling capacitors 24 to load resistors 26. The output of the differential amplifier 20 is coupled to emitter followers 22 through coupling capacitors 24 to load resistors 26. The output from the load resistors 26 are coupled via variable resistors 28 through a transient protection network 29 to the output terminals 31, which are coupled across an ordinary pair of wires 30 used for the transmission of the video signals from the camera 10. The variable resistors 28 are used to match the characteristic impedance of the wires 30 in order to minimize reflections and large variations in the system frequency response. The balanced output, which is protected by the transient protection network 29 (of any number of suitable devices designed for this purpose, such as thyristors, gas discharge surge protectors, breakdown diodes, etc.), is connected across the output 31 as well as to the common earth terminal of the balanced system.

It should be noted that in the transmitter adapter 15, as well as the receiver adapter to be explained hereafter, a balanced system is provided which offers several advantages of the present invention which will be pointed out hereinafter. The amplifier 20, the emitter followers 22, coupling capacitors 24, load resistors 26, and other combinations such as network 29 appearing at the output terminals 31 are typically designed to have a band width from below 5 Hz to above 5 MHz. Of course, the frequency response required for television transmission is dependent on line scan and frame rates.

The ordinary pair of wires 30, which are used for transmission purposes, need not possess any special characteristics as to frequency response, particularly in the region between 100 KHz and 5 MHz, although picture quality in terms of resolution is dependent on fairly uniform response throughout the band. Telephone wires, BX cable, lamp cord wire, intercome wire, etc., may all be used satisfactorily over the design range limit intended. The transmitter adapter unit 15 and the receiver adapter unit 40 (to be described subsequently) satisfy most of the requirements up to distances of 1 mile. However, this distance is not considered to limit the present invention, since it is obvious that additional stages in either the transmitter or the receiver can extend the practical limits of any design.

It should be pointed out that most common pairs of wires do not provide adequate high-frequency response, with much of the loss attributable to di-electric losses. Accordingly, it becomes necessary to incorporate frequency compensation networks 25 which boost the high frequencies relative to the low frequencies, and thus equalize the losses in the line. In the case of the transmitter adapter 15, this is called pre-emphasis, and is desirable to have at the transmitting end in order to improve the signal-to-noise ratio of those high frequencies when received at the receiver end. Complete equalization is not generally effected at any one location, but is distributed between or among the adapter units in the chain. This is because typically the loss incurred over one mile of transmission may be on the order of 60 decibels, to 1/1000 of the original signal at 5 MHz. Due to the limited dynamic range of any practical amplifier, it may be impossible to increase the signal of one frequency 1000 times over another in a given amplification stage without limiting the signal, due to saturation or cut-off of the stage. Thus, it becomes necessary to optimize a compromise situation by placing some burden of equalization on the receiver end as well as on the transmitter end.

As was pointed out previously, a balanced system is provided with two inputs, only one of which is used for video. Although only video transmission has been discussed so far, it can readily be seen that the other input 12 of the transmitter adapter 15 may be used for audio transmission, which may be frequency multiplexed FM as in the normal allocation for such purpose. This is illustrated in FIG. 1 with a transmitter 11 shown connected to the other input terminal 12. It should also be pointed out that data transmission as well may be multiplexed, whether video or audio is or is not a primary objective. Accordingly, the usefulness of this transmission system should not be construed as limited to the transmission of video or audio signals solely. The use of the balanced system as disclosed in this invention, without the termination of one of the inputs, allows for the applicability of the present system to other types of transmission.

Referring now to FIG. 2, the receiver adapter unit 40 is quite similar in configuration to the transmitter adapter 15, with the exception that two or more differential amplifiers may be added to the first in cascade to provide the additional equalization if necessary. The wires 30, over which the transmission is sent, are connected to the input terminals 32 of the receiver adapter unit 40. A transient protection network 23 may be coupled to the input terminals 32, or for that matter to the output as was shown with respect to the transmitter adapter 15 as well to provide added protection. Potentiometers 34 are coupled between the inputs 32 and the earth terminal, and additionally potentiometers 35 and 36 are coupled across the balanced input. The addition of potentiometers 35 and 36 maximize the balance to earth on each line, thus increasing the common mode rejection to a maximum, and minimizing interference to external fields. The addition of the potentiometers 34 helps to match the characteristic impedance of the line with the input impedance of the receiver adapter 40. The receiver adapter 40 may also include a diode transient limiting network 37 and an input coupling network 38, similar to that illustrated in FIG. 1 with respect to the transmitter unit 15. A differential amplifier 42 follows, having a frequency compensation network 44 as well as one illustrated cascaded differential amplifier 48 with a frequency compensation network 50 coupled thereto, and an intermediate coupling network 47 which determines the low and high frequency limits with respect to the differential amplifier 48 bandwidth. An output network 52 similar to that illustrated in FIG. 1 couples the output of the receiver adapter unit 40 to a monitor 55, completing the closed circuit transmission of the television signal over the ordinary pair of wires 30. A receiver 57 is coupled to the other output to handle the audio or other type of transmission over the other wire of the balanced system. As will be seen in FIG. 2, each of the differential amplifiers 42 and 48 has a band-limiting network such as coupling capacitor, shunt resistors and capacitors, etc., in addition to frequency compensation networks 44 and 50 respectively, which boost the higher frequencies relative to the lower or intermediate frequencies. The output network 52, consisting of emitter followers and potentiometers, provides the desired drive at a matched output impedance to feed the monitor 55. It will be appreciated that any practical number of differential amplifier sections may be used in cascade to achieve a maximum equalization which is desired.

FIG. 3 illustrates in greater detail the characteristics of the differential amplifier as well as the method of frequency compensation utilized in the present invention. Although the differential amplifier is illustrated with the reference numeral 20 and the frequency compensation network with the reference numeral 25 as shown in FIG. 1, it will be appreciated that these amplifiers and networks also correspond to the differential amplifiers 42 and 48, and the frequency compensation networks 44 and 50 described in FIG. 2. The differential amplifier and frequency compensation networks are the same in both the transmitter and receiver adapter units. The input of the differential amplifier 20 is fed to a pair of transistors 60 having emitter resistors 62 and 64 coupled to the emitter thereof, and collector resistors 59 coupled to the collector thereof, as well as feedback resistors 61 coupled between the collector electrodes of transistors 60 and the outputs of the differential amplifier 20. A number of transistor emitter follower substages are coupled between the transistor 60 and the output of the differential amplifier 20. The transistors may be NPN silicon planar transistors or equivalents. A mid-band frequency compensation network 65 is coupled between the junctions of emitter resistors 62 and 64 of transistor 60. The mid-band frequency compensation network 65 consists of a potentiometer 66 having a capacitor 68 coupled to the slider 67 thereon. A high frequency compensation network 70 is coupled to the emitter electrodes of transistors 60. The high frequency compensation network consists of a plurality of switches 72, 74, 76, etc., for selectively switching a plurality of capacitors 78, 80, 82, etc. across the emitter electrodes of transistors 60. The low frequency and direct current gain of the differential amplifier 20 is fixed mainly by the sum of resistors 64 in parallel with the external potentiometer 66 in series with the emitter resistors 62. The feedback resistors 61 determine the output voltage of the amplifier 20 for a given input. With the slider 67 of the potentiometer 66 such that the capacitor 68 is shorted and the switches 72 through 76 opened, the response of the amplifier 20 is designed to remain essentially flat throughout the frequency range desired. As the slider 67 of the potentiometer 66 is moved from its original position in which capacitor 68 is shorted toward the other extreme, a frequency-sensitive shunt is effected in which the gain increases as the frequency increases, the limit of which is stopped by the initial values of resistors 62 and the remaining portion of potentiometer 66 which is not shunted by capacitor 68. Thus, by the appropriate selection of values of the potentiometer 66 and capacitor 68, losses encountered through the mid-frequency range to the high frequency range may be largely compensated for by the adjustment of the potentiometer 66. Switches 72 through 76 are used as a final boost at the extreme high frequency end of the band of interest, with the value of capacitor 78 being the smallest increment of capacitance which can be switched in. The additional switches, 74, 76, etc., provide increasingly larger values of capacitance which are increasing increments of the value of capacitor 78. Providing for incremental changes in value of the capacitor 78 in binary form makes adjustment in the setting of the frequency range considerably simpler. If desired, an additional switch can be added to connect a value of capacitance made variable for the purposes of interpolation between increments. Accordingly, by providing two forms of frequency compensation, the mid-band frequency compensation 65 and the high frequency compensation 70, most field conditions may be practically equalized under varying types of conditions within the design limits imposed. It should be pointed out that there is a lack of complicated frequency compensation networks involving tuned elements, and that in the present invention one stage is similar to the next. These features simplify most tune-up procedures, which may be done without oscilloscopes, signal sources, meters, etc., and that visual observation of the television monitor 55 is all that is required to achieve optimum results with the present invention.

It may be desirable to add repeaters in a given length of transmission instead of placing the burden of compensating totally on the transmitter and receiver adapters. In the practical sense, it would be beneficial to boost the signal at some intermediate point along the transmission line before it becomes entirely masked by noise by the time it reaches the receiver. A repeater in the context mentioned is nothing more than a receiver with special input and output characteristics such as impedance-matching networks and/or limiting devices for protection, both of which have been described earlier in connection with the receiver and transmitter units embodied in the present invention.

The use of a double-ended system utilizing differential amplifiers as in the present invention provides flexibility to the transmission of different types of signals over the same ordinary pair of wires and provides a common mode rejection not applicable to single-ended output systems. The balance mode also provides an insensitivity to external fields and interference much like that of a coaxial cable without requiring the coaxial cable as the transmission medium.

The system in the present invention, which provides similar compensating techniques in both the transmitter and receiver adapter units, simplifies setup time and adjustment procedures. Only minor adjustments are required for each particular installation, and there are no critically tuned circuits which must be adjusted. The units are small size, low weight, and require little power, and are nominal in cost. As such they compare favorably in use where coaxial cable could be used, and of course are extremely desirable in those cases where the use of coaxial cable is impractical.

Since other modifications and changes, varied to fit particular operating requirements and environments, will be apparent to those skilled in the art, the invention is not considered limited to the examples chosen for purposes of disclosure, and covers all modifications and changes which do not constitute departures from the true spirit and scope of this invention.

What is claimed is:

1. A communications sytems for the transmission from a television camera or other transmitter of different type signals to a monitor of closed circuit television signals or receiver for said different type signals over an ordinary pair of wires, comprising
   a. a transmitter adapter connected to an ordinary pair of wires for coupling a televison camera to said pair of wires,
   b. said transmitter adapter including transmitter differential amplifier means having a transmitter frequency compensation network coupled thereto,
   c. a receiver adapter connected to said ordinary pair of wires at a desired distance from said transmitter adapter for coupling a television monitor to said pair of wires,
   d. said receiver adapter including receiver differential amplifier means having a transmitter compensation network coupled thereto,
   e. said transmitter and receiver differential amplifier means each having a pair of input terminals coupled to a differentially connected, emitter-coupled transistor pair,
   f. said transmitter and receiver frequency compensation networks each having mid-band and high-band frequency compensation networks coupled between the emitters of said emitter-coupled transistor pair for providing frequency compensation for transmission losses through said pair of wires,
   g. said mid-band frequency compensation means comprising a potentiometer having a slide thereon coupled to a capacitor which is coupled to one side of said potentiometer, in which the gain of said differential amplifier means increases with frequency as said slide is moved from a shortened position with respect to said capacitor to the other extreme on said potentiometer.

2. A communication system for the transmission from a television camera or other transmitter of different type signals to a monitor of closed circuit television signals or receiver for said different type signals over an ordinary pair of wires, comprising a. a transmitter adapter connected to an ordinary pair of wires for coupling a television camera to said pair of wires,
b. said transmitter adapter including transmitter differential amplifier means having a transmitter frequency compensation network coupled thereto,
c. a receiver adapter connected to said ordinary pair of wires at a desired distance from said transmitter adapter for coupling a television monitor to said paid of wires,
d. said receiver adapter including receiver differential amplifier means having a transmitter compensation network coupled thereto,
e. said transmitter and receiver differential amplifier means each having a pair of input terminals coupled to a differentially connected, emitter-coupled transistor pair,
f. said transmitter and receiver frequency compensation networks each having mid-band and high-band frequency compensation networks coupled between the emitters of said emitter-coupled transistor pair for providing frequency compensation for transmission losses through said pair of wires,
g. said high frequency compensation means comprising a plurality of switches and serially coupled capacitors coupled in shunt, with one of said capacitors representing the smallest increment of capacitance which can be switched in with additional switching providing increasingly larger increments of capacitance for providing compensation in the high-frequency end of the transmission band.

3. A communications system for the transmission from a television camera or other transmitter of different type signals to a monitor of closed circuit television signals or receivers for said different type signals over an ordinary pair of wires, comprising a. a transmitter adapter connected to an ordinary pair of wires for coupling a television camera to said pair of wires,
b. said transmitter adapter including transmitter differential amplifier means having a transmitter frequency compensation network coupled thereto,
c. a receiver adapter connected to said ordinary pair of wires at a desired distance from said transmitter adapter for coupling a television monitor to said pair of wires,
d. said receiver adapter including receiver differential amplifier means having a transmitter compensation network coupled thereto,
e. said transmitter and receiver differential amplifier means each having a pair of input terminals coupled to a differentially connected, emitter-coupled transistor pair,
f. said transmitter and receiver frequency compensation networks each having mid-band and high-band frequency compensation networks coupled between the emitters of said emitter-coupled transistor pair for providing frequency compensation for transmission losses through said pair of wires,
g. said transmitter and receiver adapters each having differential connected inputs an outputs, respectively, and
h. said differential inputs having said television camera connected to one input thereof and a multiplex transmitter connected to the other input thereof and said differential outputs having said monitor connected to one output thereof for receiving signals from said television camera and receiver means connected to the other output thereof for receiving signals from said multiplex transmitter which system provides isolation between each input and output thereof to prevent interaction therebetween.

* * * * *